United States Patent Office 3,611,736
Patented Oct. 12, 1971

3,611,736
METHOD OF PROTECTING AND RESETTING POLES IMBEDDED IN SOIL
Jack P. Goodman, 2500 S. Tejon, Englewood, Colo. 80110
Filed Jan. 26, 1970, Ser. No. 5,529
Int. Cl. E02d 5/60
U.S. Cl. 61—54      2 Claims

ABSTRACT OF THE DISCLOSURE

A method of protecting poles imbedded in soil includes excavating the ground around an existing set pole a short distance from the pole and to a depth to uncover the pole from ground-line to a point below the deterioration area, cleaning the excavated portion of the pole, partially filling the excavated pole with a mixture of a synthetic resin and a blowing agent, permitting the ingredients to react to form a foamed resin and then permitting the resin to set, thereby sealing the excavated area of the pole and completely filling the excavation.

---

In recent years a number of utility companies have recognized the value of extending the service life of standing utility poles by uncovering and inspecting that area of the pole which is from a foot to three feet below the ground, treating the decayed portions and then re-covering the excavated portion around the pole. Most wooden poles are originally treated by some sort of a preservative, mostly creosote, prior to insertion of the pole in the ground. It has been found, however, that all poles decay at or below the ground-line some time during the life of the pole. The rapidity of the decay is generally dependent upon many factors and among these are climate and soil conditions. It is recognized that the major cause of deterioration of the pole at or below the ground-line is either attack by fungi or insects or both. Fungi, which are microscopic plants, must have organic material in which to live and the pole offers a food supply. The growth of the fungi is dependent upon the surrounding conditions, and growth includes such requirements as air, mild temperatures and moisture. All of these conditions are generally present in the soil at or just below the ground-line of the pole.

Prior methods of renovating poles included excavating a substantial amount of dirt around the pole to a depth of a foot to three feet, removing the decayed wood, treating the clean wood with a preservative, then placing a protective "bandage" (which is usually tar paper) around the pole and then back-filling the excavated portion.

According to the present invention, there is provided a method preserving and resetting a pole which includes excavating around a pole to expose a portion of the pole from one to three feet, cleaning the pole and then filling the excavation with a foamable resin which foams to completely seal the exposed pole portion from the excavation, fill the excavation and when the resin hardens, re-sets the pole in the ground. The method utilizes a narrow excavation, preferably by vibrating equipment, and eliminates the wrapping of the pole with tar paper, the back-filling, and the tamping of the back-fill. In most instances, the method eliminates the need of re-treating the pole with a preservative. In addition, since the foam plastic forms a tight, air and moisture proof seal around the pole, the deterioration due to insects, fungi and moisture is prevented. In addition, the foam plastic completely fills the excavation, and on expansion, by foaming, presses into the soil around the excavation and into all the holes and crevices of the pole. This provides a connection between the pole and resin providing a better re-set of the pole in the ground.

Included among the objects and advantages of the present invention is a method of preserving and re-setting standing poles by exposing the decayed portion of a pole, and then sealing the pole and filling the excavation with a foamed and set plastic.

Another object of the invention is to provide a simplified method of preserving and re-setting poles by filling an excavation around a pole with a foamable plastic which expands filling the hole and completely enclosing the portion of the pole exposed to the resin.

These and other objects and advantages of the invention may be readily ascertained by referring to the following description and appended illustrations, in which.

Figure 1:
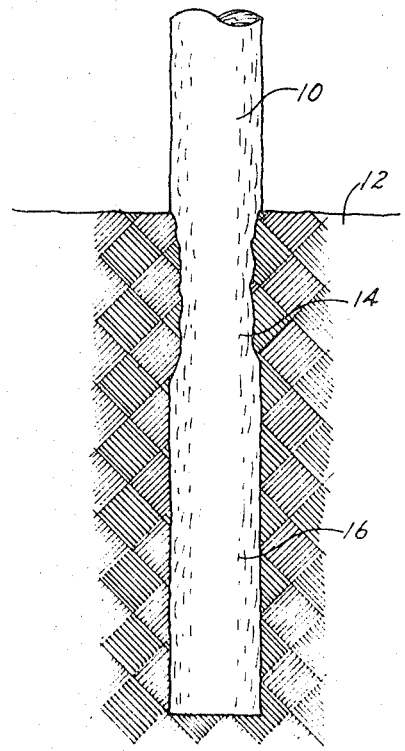
FIG. 1 is a side elevational view, in section, of a set pole illustrating the decayed portions of the pole adjacent the ground-line.
Figure 2:
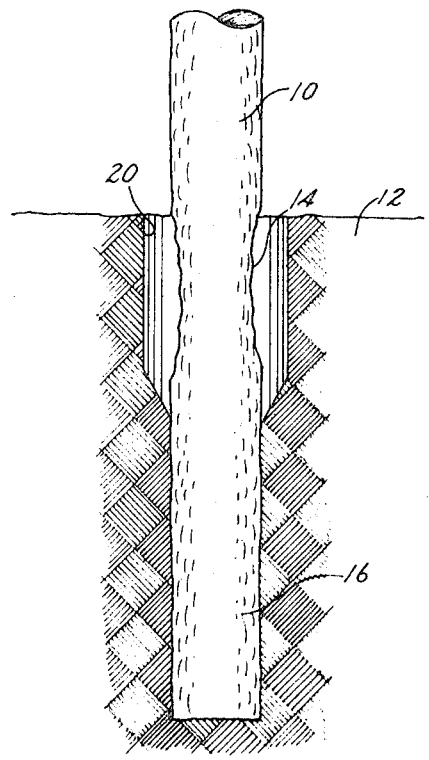
FIG. 2 is a side elevational view, in section, of a pole with an excavation around the pole exposing the deteriorated portion.
Figure 3:
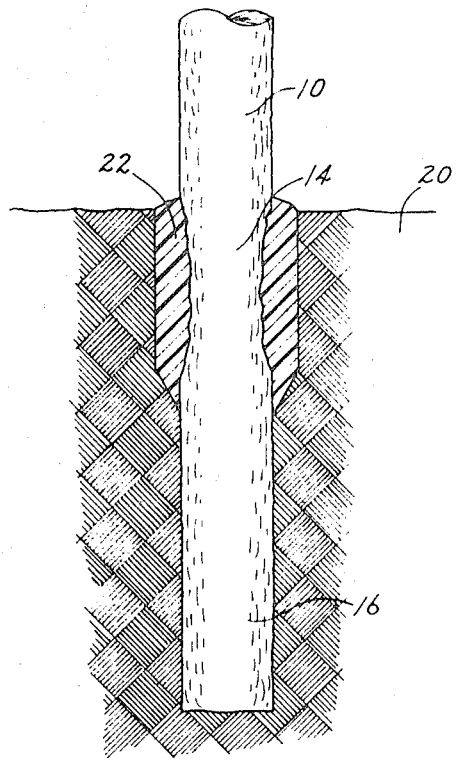
FIG. 3 is a cross-sectional view of a treated pole having a foam plastic filling the excavated area and sealing the deteriorated portion of the pole.

As illustrated in FIG. 1, a set pole 10 is embedded in the ground 12 to a depth previously determined to be sufficient for the load conditions on the pole. A surface area 14 on the pole, from the ground surface to a point therebelow, is indicated as deteriorated by wavy lines, and the butt 16 of the pole is indicated as being essentially undeteriorated. To treat the pole in the deteriorated area, the earth is excavated in a narrow annulus 20, indicated in FIG. 2, down to point slightly past the area of deterioration 14. A spade-type tool attached to a conventional type air, hydraulic or electric hammer, paving breaker or tamper may be used to make the excavation around the pole. Using the conventional power actuated tool, the earth around the existing pole may be compacted away from the pole forming the excavation. The depth necessary for the excavation, is determined by the ground conditions, however, it usually extends from one to three feet, and generally on the order of about 15 to 20 inches. After the excavation is complete, a wire brush or the like may be worked against the pole in the excavation to clean the pole of dirt and decayed wood. A mixture of a synthetic plastic and a foaming agent is then poured into the excavation, partially filling the same, to a pre-determined depth. These materials are then permitted to react, which causes foaming of the resin, and after the resin is foamed it is permitted to set, forming a hard cellular mass 22 in the excavation. The foaming of the plastic completely fills the void between the pole and the wall of the excavation and exerts pressure against the earth around the pole and against the pole itself. The plastic material adheres to the pole itself, entering the holes, cracks and crevices in the pole and protects all exposed parts of the pole covered by the plastic. The plastic on foaming expands in all directions, thus not only filling the voids in the pole, but, also, the voids in the wall of the excavation, increasing the earth pressure around the hole. One very effective synthetic resin useful for the process is a polyurethane, which has been mixed with a blowing agent to liberate an inert gas during the reaction and the setting of the polyurethane. The gas foams the resin expanding the same and when hardened it remains in its expanded form, forming a hard, cellular material. One foaming agent useful for the polyurethane is a polyisocyanate, conventional in the art, and usually the chemical reaction is between the polyester resin, water and the polyisocyanate to form the cellular structure by the release of internal carbon dioxide, and on polymerization the resin is formed and sets into a solid form. In certain instances, it may be desirable to add an accelerator, for example, a tertiary amine, for controlling the reaction. The density of the set foam is generally controlled by predetermining the quantity of water in the mixture and/or the quantity of isocyanate used. It has been found that a four pound per cubic foot density of the set foamed polyurethane material gives a strength of about 80 lbs. per square inch, which is ample in most cases to secure the pole in predetermined position for most installations. The strength of the set resin, of course, may be varied by increasing or decreasing the density of the set resin.

In the place of the polyurethane, other types of plastics or resins may be used, and these include such resins as phenol-aldehydes, urea-aldehydes resins, polystyrene, polyethylene, polyvinyl polymers and copolymers, cellulose acetates, both natural and synthetic elastomers, etc. Generally, the cost of the plastic material is a major consideration for treatment of a large number of poles, but since only a few pounds of resin are needed for treatment of each pole, the cost of the resin is, in effect, of minor significance for the treatment of each pole. Blowing agents conventionally used includes ammonium compounds, inorganic carbonates, organic blowing agents conventionally used in the resin or plastic art, etc. Such materials are common in the foamed plastic art.

When the cost factor is of major consideration, polyurethane is a resin of choice due to availability, low cost, fast cure, etc. Polyurethane resin as an expanded foam generally cures into a mass having a strength of from 60 to 100 or more pounds per square inch, and a density of from 3–10 lbs. per cubic foot. These qualities are largely determined by the amount of blowing agent present and the amount of water in the polyurethanes.

Various additives may be included in the polyurethane or synthetic plastic resin which will add strength or other characteristics to the set cellular material. For example, fiberglass in reasonably short segments provides an ideal reinforcing material as it increases the strength of the cured material and adds a protective quality of its own. The amount of fiberglass used usually is in a range of a quarter to two or three pounds per pound of plastic. The fiberglass, also, substantially increases the compressive strength of the material. Other fillers and reinforcing materials may be used and these include such things as bentonite, clays, rock-wool, and the like, which generally add to the strength of the plastic.

A maintenance program for a utility company generally includes examining poles at periodic intervals. A maintenance schedule which requires examination of poles in about five years, including a treatment of the poles at such five year intervals, greatly extends the life of the poles in the power or utility line. The cost per pole treated is considerably less than known methods of treating such partially decayed poles. The foamed plastic seals the area from ground level to below the area where normal deterioration occurs, and this reduces the maintenance of the line and reduces the replacement of such poles.

I claim:

1. A method of treating and preserving set and standing wooden poles, comprising excavating the soil in an annulus around such a pole for a short distance from the pole and axially downwardly along the pole a sufficient distance to expose decayed portions of the pole; compacting the soil about the excavated annulus into the surrounding earth; cleaning dirt and decayed wood from such a pole; partially filling said excavation with a liquid mixture including foamable synthetic plastic, a filler material, and a foaming agent, then permitting said mixture to react to foam said synthetic plastic to fill the excavation and the exposed holes and crevasses on said pole and the wall of said hole; and then permitting said foamed plastic to set forming a hardener cellular mass sealing said exposed pole portions in said excavation against air and moisture and strengthening the set of said pole.

2. A method according to claim 1 wherein said filler material is glass fibers.

References Cited

UNITED STATES PATENTS

| | | | |
|---|---|---|---|
| 819,282 | 5/1906 | Hunt | 52—517 |
| 1,639,601 | 8/1927 | Gardiner | 52—517 X |
| 2,109,508 | 3/1938 | Schmittutz | 52—517 X |
| 3,403,520 | 10/1968 | Goodman | 61—53.5 |
| 3,518,835 | 7/1970 | Perry | 61—46 |

DAVID J. WILLIAMOWSKY, Primary Examiner

D. H. CORBIN, Assistant Examiner

U.S. Cl. X.R.

52—169, 515, 517